(12) United States Patent
Chen et al.

(10) Patent No.: US 9,694,765 B2
(45) Date of Patent: Jul. 4, 2017

(54) CONTROL SYSTEM FOR AN AUTOMOTIVE VEHICLE

(71) Applicant: Hitachi, Ltd, Tokyo (JP)

(72) Inventors: Heming Chen, Novi, MI (US); Donald J. McCune, Farmington Hills, MI (US); Sujit Phatak, Farmington Hills, MI (US); Yuan Xiao, Farmington Hills, MI (US)

(73) Assignee: Hitachi, Ltd., Tokyo (JP)

( * ) Notice: Subject to any disclaimer, the term of this patent is extended or adjusted under 35 U.S.C. 154(b) by 15 days.

(21) Appl. No.: 14/690,821

(22) Filed: Apr. 20, 2015

(65) Prior Publication Data
US 2016/0304038 A1 Oct. 20, 2016

(51) Int. Cl.
*B60R 16/023* (2006.01)

(52) U.S. Cl.
CPC ................ *B60R 16/023* (2013.01)

(58) Field of Classification Search
CPC .................................... B60R 16/023
See application file for complete search history.

(56) References Cited

U.S. PATENT DOCUMENTS

| | | | | |
|---|---|---|---|---|
| 7,558,775 B1* | 7/2009 | Panigrahy | ........... | H04L 45/7457 |
| 8,612,100 B2* | 12/2013 | Goy | ........... | B60R 16/02 |
| | | | | 701/48 |
| 9,205,809 B2* | 12/2015 | Becker | ........... | G06F 21/74 |
| 9,231,998 B2* | 1/2016 | Lu | ........... | H04L 67/10 |
| 9,254,841 B2* | 2/2016 | Fehling | ........... | B60W 10/18 |
| 2003/0135678 A1* | 7/2003 | Andre | ........... | G06F 13/364 |
| | | | | 710/243 |
| 2007/0174683 A1* | 7/2007 | Gehring | ........... | G06F 9/505 |
| | | | | 714/12 |
| 2013/0268798 A1* | 10/2013 | Schade | ........... | G06F 11/1487 |
| | | | | 714/3 |
| 2015/0212952 A1* | 7/2015 | Wegner | ........... | G06F 8/67 |
| | | | | 711/152 |

* cited by examiner

*Primary Examiner* — Thomas Tarcza
*Assistant Examiner* — Michael Berns
(74) *Attorney, Agent, or Firm* — Mattingly & Malur, PC

(57) ABSTRACT

A control system for a vehicle having a plurality of subsystems in which each subsystem includes a sensor and/or actuator. A general purpose processor is programmed with a plurality of software applications in which each software application is associated with one of the vehicle subsystems. The subsystems and processor communicate with each other through an electrical bus and each subsystem includes a communication interface to receive commands from the processor as well as to send task signals to the processor. A task arbitrator prioritizes the order of execution of multiple task signals received by the processor during a preset time period. The general purpose processor then initiates execution of the software application associated with the subsystem of the sensor signal received from the task arbitrator and thereafter transmits a control signal to one or more of the subsystems via the bus as a result of execution of the associated software application.

20 Claims, 6 Drawing Sheets

| Task ID | Safety Level | Task Priority | App ID | Time Window |
|---|---|---|---|---|
| 1 | 0 | 2 | 3 | $T_N$ |
| 2 | 3 | 2 | 8 | $T_N$ |
| 3 | 1 | 2 | 12 | $T_N$ |
| 4 | 2 | 3 | 5 | $T_N$ |
| 5 | 0 | 1 | 2 | $T_N$ |
| 6 | 1 | 5 | 14 | $T_{N+1}$ |
| ••• | ••• | ••• | ••• | ••• |

Fig-11a

| Task ID | Safety Level | Task Priority | App ID | Time Window |
|---|---|---|---|---|
| 5 | 0 | 1 | 2 | $T_N$ |
| 1 | 0 | 2 | 3 | $T_N$ |
| 3 | 1 | 2 | 12 | $T_N$ |
| 6 | 1 | 5 | 14 | $T_N$ |
| 4 | 2 | 3 | 5 | $T_N$ |
| 2 | 3 | 2 | 8 | $T_{N+1}$ |
| ••• | ••• | ••• | ••• | ••• |

Fig-11b

| CPU ID | Mode | Assigned to App with Safety Level |
|---|---|---|
| 0 | Shared | N/A |
| 1 | Shared | N/A |
| 2 | Shared | N/A |
| 3 | Shared | N/A |
| ••• | ••• | ••• |

Fig-12a

| CPU ID | Mode | Assigned to App with Safety Level |
|---|---|---|
| 0 | Isolation | 0 |
| 1 | Isolation | 1-2 |
| 2 | Isolation | 3-4 |
| 3 | Isolation | 5 + |
| ••• | ••• | ••• |

Fig-12b

CONTROL SYSTEM FOR AN AUTOMOTIVE VEHICLE

BACKGROUND OF THE INVENTION

I. Field of the Invention

The present invention relates to a control system for an automotive vehicle.

II. Description of Related Art

Modern day automotive vehicles are highly sophisticated systems which contain as many as 70 or even more different control systems for controlling the various functions of the vehicle. These control systems include sensors and/or actuators and are associated with systems as simple as a door lock, to more complex systems such as the engine controller, transmission controller, stability controller, active suspension, and the like.

Currently, the electronic architecture of the automobile typically consists of a number of self-contained subsystems that communicate with each other through a shared network interface or bus, such as a CAN bus. These various subsystems, furthermore, are typically constructed by diverse suppliers so that each subsystem has its own hardware and its own software design. This, in turn, makes the in-vehicle integration of the various subsystems, testing, and troubleshooting of the subsystems challenging as well as time consuming. Furthermore, each subsystem typically includes its own processor for determining the status of one or more sensors and issuing the appropriate output signals to actuate actuators, so that the overall cost of the individual systems is quite high.

The current electronic architecture of automotive vehicles also makes it difficult to update or introduce new features to a car that has already been built and/or distributed to a customer. In fact, in many cases, it is virtually impossible to retrofit new functionalities into a car once completed. Even if it is possible to retrofit new functionalities, complete replacement of one or more multiple parts, or the entire subsystem, may be required thus increasing the overall cost of the retrofit. Furthermore, in many safety-critical functions, such as the steer-by-wire or autonomous driving subsystem, replacing a few parts in an automobile is not a feasible solution since it would be necessary for the entire vehicle to undergo extensive safety testing.

SUMMARY OF THE PRESENT INVENTION

The present invention provides a control system for an automotive vehicle which overcomes the above-mentioned disadvantages of the previously known electronic systems.

In brief, the control system of the present invention is designed for use with an automotive vehicle having a plurality of subsystems. Each subsystem, furthermore, includes one or more sensors and/or actuators which, when actuated, measure a condition or perform a vehicle function. The systems include, inter alia, the radar sensor subsystem, brake actuator subsystem, active suspension subsystem, infotainment system, backup camera, and the like.

The system of the present invention includes a general purpose processor preferably comprised of multiple processing units or, alternatively, a single processing unit with multiple cores. This general purpose processor is programmed with a plurality of software applications wherein each software application is associated with the operation of one of the vehicle subsystems. Preferably, all of the software is contained in different memory partitions accessible to the general purpose processor.

An electronic bus electrically connects the general purpose processor to the vehicle subsystems. This bus thus provides communication from the general purpose processor and the subsystems.

Each subsystem includes a communication interface to receive commands from the general purpose processor and/or to send sensor signals or tasks to the general purpose processor via the bus. A CAN bus may be used for this communication between the general purpose processor and the subsystems.

A task arbitrator is interposed between the bus and the general purpose processor. The task arbitrator prioritizes the order of execution of multiple sensor signals received by the general purpose processor during a preset time period, such as a few milliseconds. This prioritization of the multiple sensor signals by the arbitrator is performed in accordance with the safety level of the sensor signal. For example, a task received from a brake actuator or radar sensor would be assigned a much higher priority than a task received from the infotainment subsystem.

The general purpose processor then initiates execution of the software application associated with the subsystem of the sensor signal received from the task arbitrator. Thereafter, the general purpose processor transmits a control signal to one or more subsystems via the bus as a result of the execution of the associated software application.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIGS. 11A and 11B are tables illustrating the operation of the task arbitrator; and FIGS. 12A and 12B are tables illustrating the operation of the task distributor in shared mode and isolation mode.

DETAILED DESCRIPTION OF PREFERRED EMBODIMENTS OF THE PRESENT INVENTION

Figure 1:
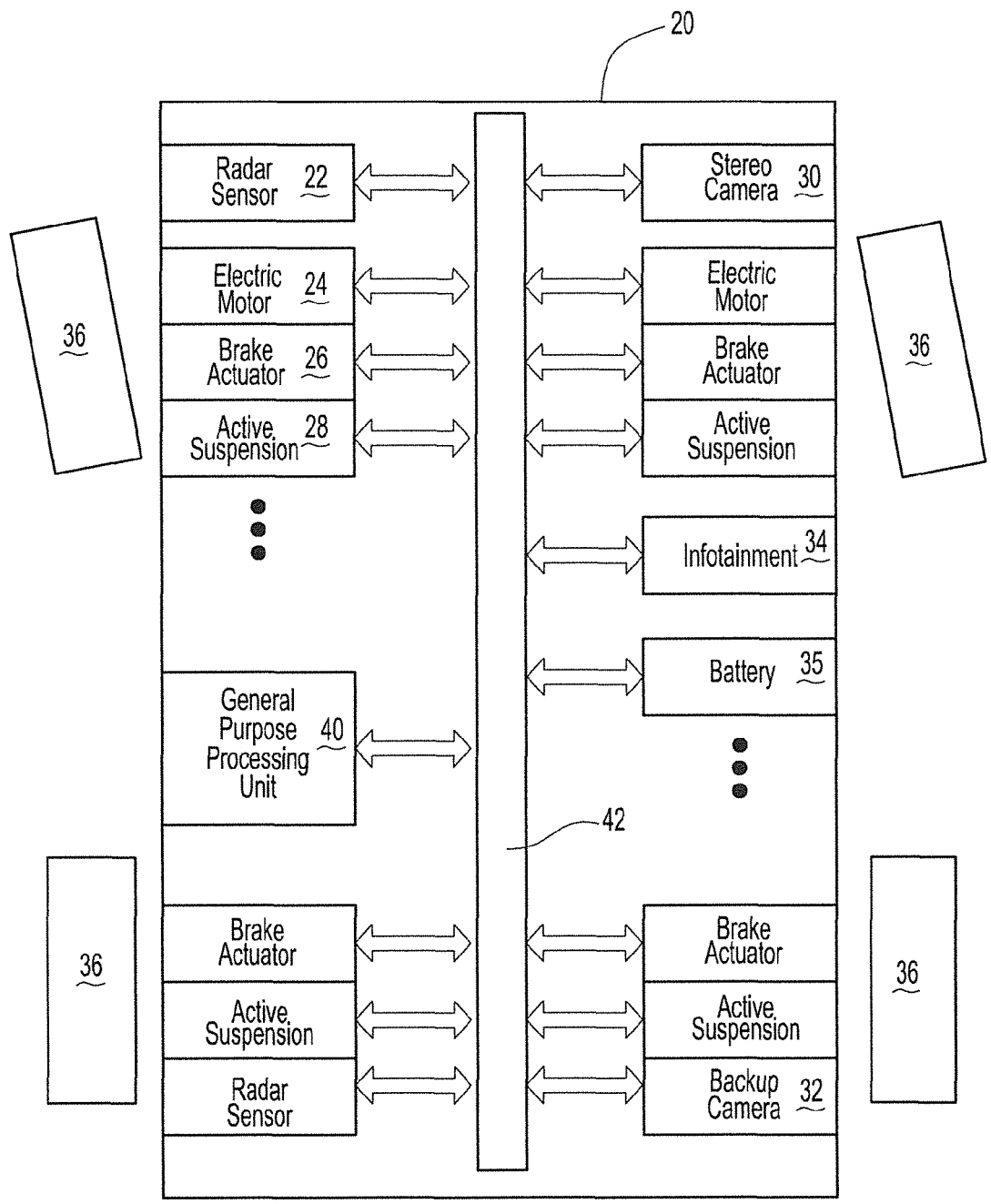
FIG. 1 is a diagrammatic view illustrating an electric vehicle equipped with the control system of the present invention.

With reference first to FIG. 1, a plurality of vehicle subsystems for a vehicle 20, such as an electric vehicle, are shown. The various subsystems are illustrated by way of example only and include, for example, a radar sensor subsystem 22, an electric motor control subsystem 24, a brake actuator subsystem 26, an active suspension subsystem 28, a stereo camera subsystem 30, a backup camera subsystem 32, an infotainment subsystem 34, and a battery subsystem 35. Furthermore, some of the subsystems, such as the electric motor control subsystem 24, brake actuator subsystem 26, and active suspension subsystem 28, are repeated for each of the four vehicle wheels 36.

A general purpose processor 40 is contained on the vehicle. The general purpose processor 40 communicates with the various subsystems 22-35 through an electronic bus 42, preferably using asynchronous communication.

The various vehicle subsystems perform the function as their name implies. For example, the radar sensor subsystem 22 detects obstacles in front of the vehicle 20 and forwards that information to the processor 40. Similarly, the electric motor subsystem is associated with each of the vehicle wheels 36 and controls the actuation of the electric motor used to propel the vehicle 20. Similarly, the brake actuator subsystem 26 controls the actuation of the brakes in order to slow the vehicle.

Likewise, the active suspension subsystem 28 controls the height and stiffness of the suspension system for each wheel 36. The dampening of the suspension system 36 is also employed to dynamically change the dampening characteristics to optimize passenger comfort, driving experience, or other purposes.

The stereo camera subsystem 30 takes real time stereo images of objects in front of the vehicle and conveys these images to the processor 40 via the bus 42. Such camera images may be used by image processing by the processor 40 to detect obstacles, read traffic signs, determine lane departures, or other purposes. Similarly, the backup camera subsystem 32 controls the activation of the backup camera for the vehicle.

The infotainment subsystem 34 integrates the radio, MP3 player, A/C control, GPS navigation system, CD player, etc. The battery subsystem 35 controls all functions associated with the vehicle battery, such as charging, maintenance, and monitoring.

Figure 2:
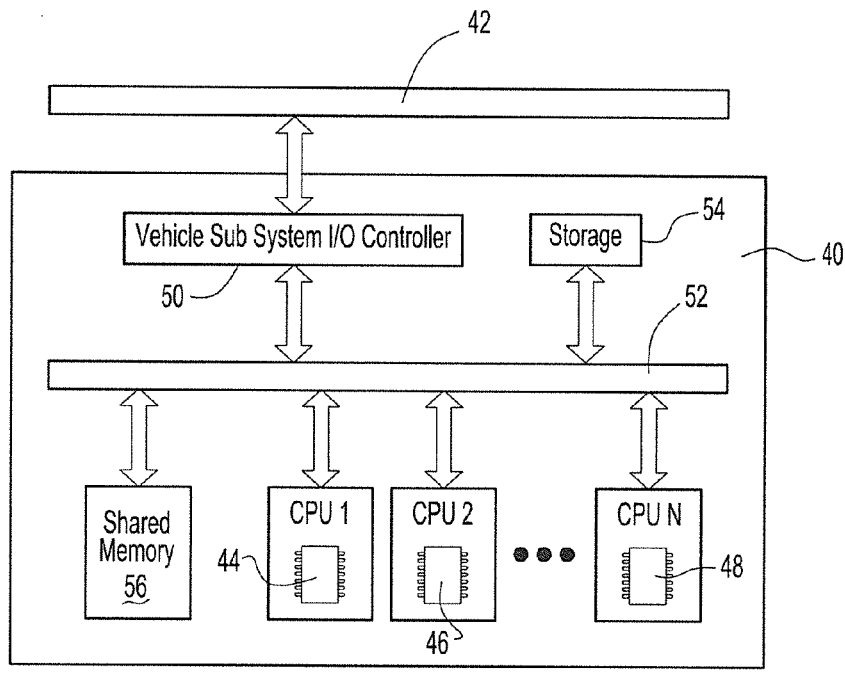
FIG. 2 is a block diagrammatic view of the general purpose processing unit.

With reference now particularly to FIG. 2, all of the subsystems 22-35 (FIG. 1) communicate with the general purpose processor 40 through the bus 42. The processor 40 preferably includes a plurality of processing units 44, 46, and 48. Alternatively, however, the general purpose processing unit 40 may contain one or more processors having multiple cores in which each core is capable of executing an algorithm independently of the other cores.

The general purpose processor 40 includes an I/O controller 50 which controls the communication between the processor 40 and the various subsystems. This controller 50 communicates with an internal bus 52 in the processor 40 which, in turn, communicates with the various processing units 44-48. In addition, the processor 40 includes a persistent storage device 54 which communicates with the processing units 44-48 through the bus 52. This storage device 54 contains various application software wherein one application software is associated with each of the subsystems 22-35 (FIG. 1) to receive sensor signals or tasks from the subsystems 22-35 and/or to generate output control signals from the processor 40 back to the subsystems via the bus 42.

Figure 3:
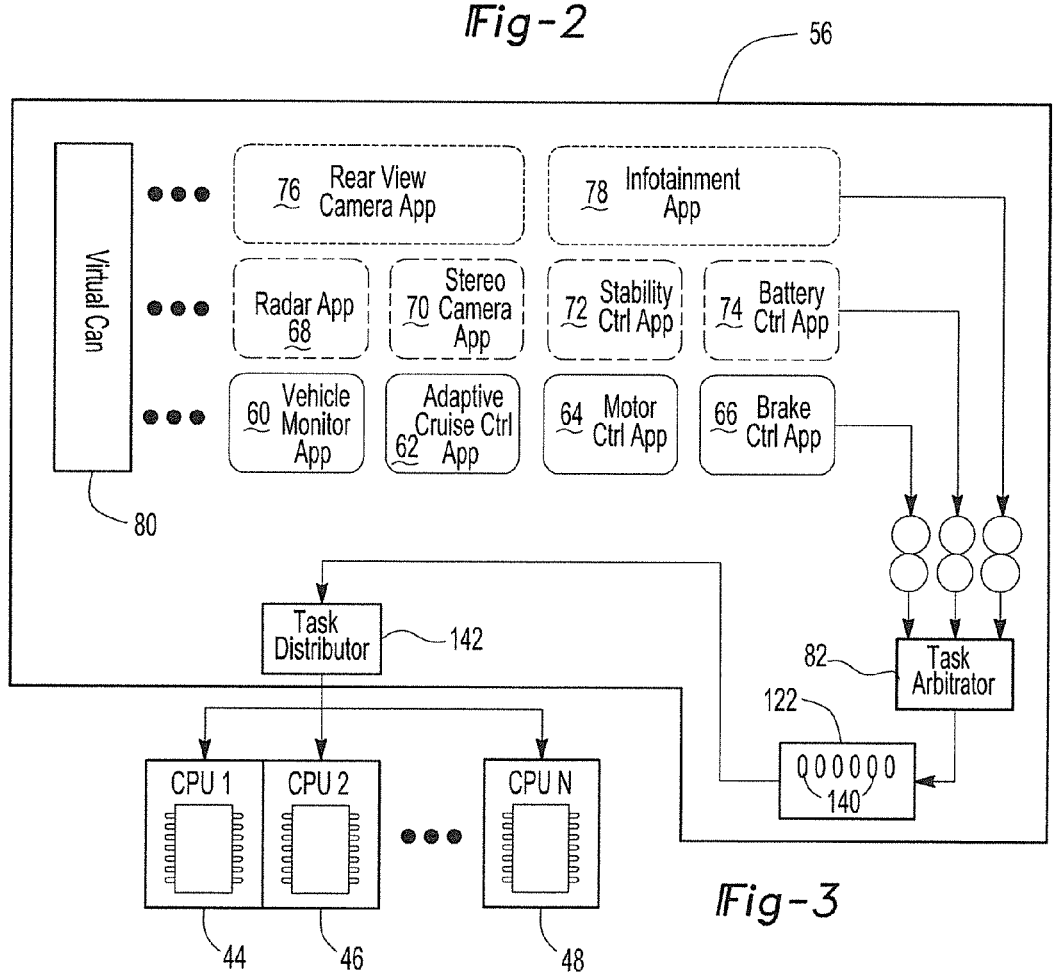
FIG. 3 is a block diagrammatic view of the shared memory unit.

With reference now to FIGS. 2 and 3, the processor 40 includes shared memory 56 having a plurality of applications contained in different memory partitions wherein one application is associated with one of the vehicle subsystems 22-35. For example, application 60 is directed to a vehicle monitor application, application 62 is directed to the adaptive cruise control application, application 64 is directed to the motor control application, and application 66 is directed to the brake control application. Furthermore, the four applications 60-66 are all critical to the safe operation of the vehicle 20 and, for that reason, are all arranged on a same safety level in the shared memory 56.

Conversely, applications that are not as safety critical as the applications 60-66 are located on a second level in the shared memory 56. This second level includes, for example, a radar application 68, stereo camera application 70, stability control application 72, and battery control application 74. All of these applications 68-70 are important to the operation of the vehicle, but are not critical to the safe operation of the vehicle.

Lastly, applications that have little or no impact on the safe operation of the vehicle are located in yet another layer. These applications include a rearview camera application 76 and infotainment application 78. Both of these applications could fail completely without adversely affecting the safe operation of the vehicle.

The execution of the application corresponding to the received task signal from one of the subsystems 22-35 is then assigned to one of the processing units 44-48 in a manner that will subsequently be described in greater detail. However, following the execution of that program, the processing unit 44-48 executing the algorithm associated with the particular subsystem then generates output control signals through the bus 52, I/O controller 50, and bus 42 back to one or more of the appropriate subsystems 22-35 which may, or may not, be the same as the subsystem 22-35 generating the original task signal. In any event, the control signal sent by the controller 40 back to one or more of the subsystems 22-35 then typically actuates an actuator to perform some vehicle function. This vehicle function may be as simple as locking the car doors when the vehicle speed exceeds a certain threshold, or as complex as actuating the brakes in the brake actuator subsystem 26.

Figure 4:
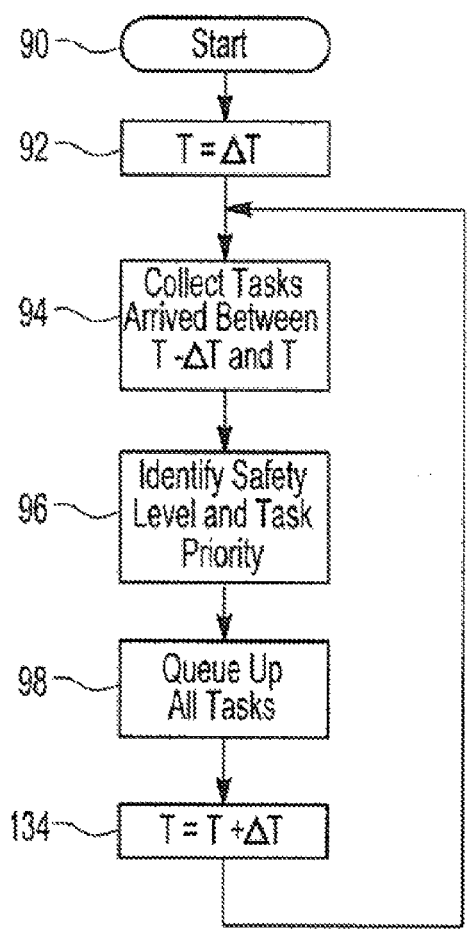
FIG. 4 is a flowchart illustrating the operation of the task arbitrator.

The task signals received from the various subsystems 22-35 are coupled by a virtual bus 80 to a task arbitrator 82. The task arbitrator prioritizes all of the task signals received from the subsystem within a predetermined time period in accordance with their safety level. A flowchart illustrating the operation of the task arbitrator is shown in FIG. 4. After initiation at step 90, step 90 proceeds to step 92 where the time period during which the task signals are collected is set to a time period T which is equal to $\Delta T$. Typically, T will equal a few milliseconds. Step 92 then proceeds to step 94.

At step 94, the task arbitrator 82 collects all of the task signals received during the time period T-$\Delta T$ and T. All the tasks are collected regardless of their safety level. Step 94 then proceeds to step 96.

Step 96 then identifies the safety level for all of the tasks received during the time period $\Delta T$. Step 96 then proceeds to step 98 where the task arbitrator queues up or prioritizes the received tasks according to their safety level. Step 604 is described in greater detail in FIG. 5.

Figure 5:
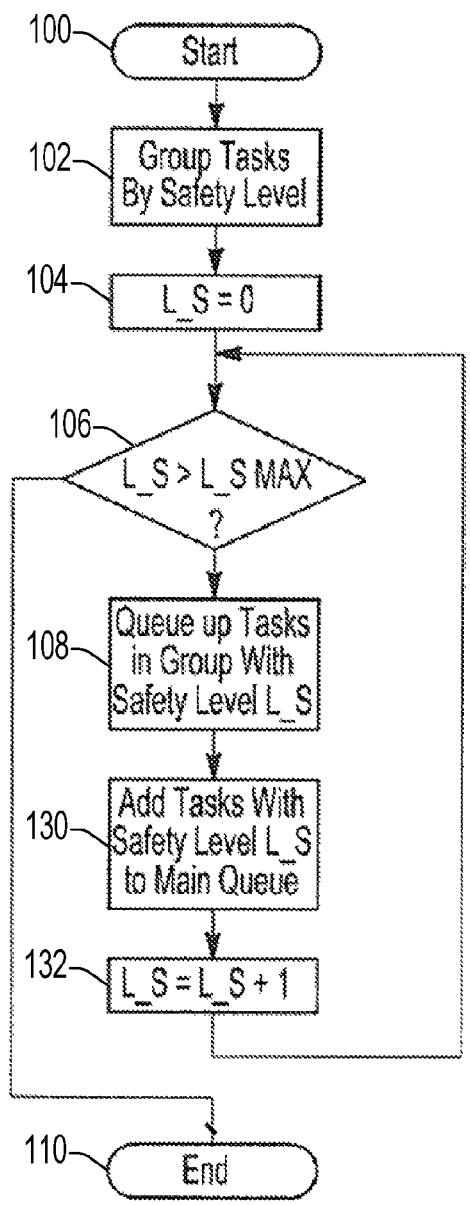
FIG. 5 is a flowchart illustrating a portion of the operation of the task arbitrator.

With reference then to FIG. 5, after the algorithm begins at step 100, step 100 proceeds to step 102. At step 102, the tasks are grouped by their safety level with 0 level being the highest safety level. Consequently, after step 102, all of the level 0 tasks are grouped together, all of the level 1 tasks are grouped together, all of the level 2 tasks are grouped together, and so on. Step 102 then proceeds to step 104.

At step 104, the safety level L_S is set to 0, i.e., the highest safety level. Step 104 then proceeds to step 106 which compares the safety level L_S with a maximum threshold L_S_MAX. Assuming that the safety level L_S is less than the maximum safety level L_S_MAX, which will always occur during the first execution of step 106 (assuming there are tasks to be processed), step 106 proceeds to step 108. Otherwise, step 106 will branch to step 110 and terminate the algorithm.

At step 108, the algorithm queues up tasks in the group with the same safety level L_S. The algorithm of step 108 is shown in greater detail in FIG. 6.

Figures 6, 7, 8:
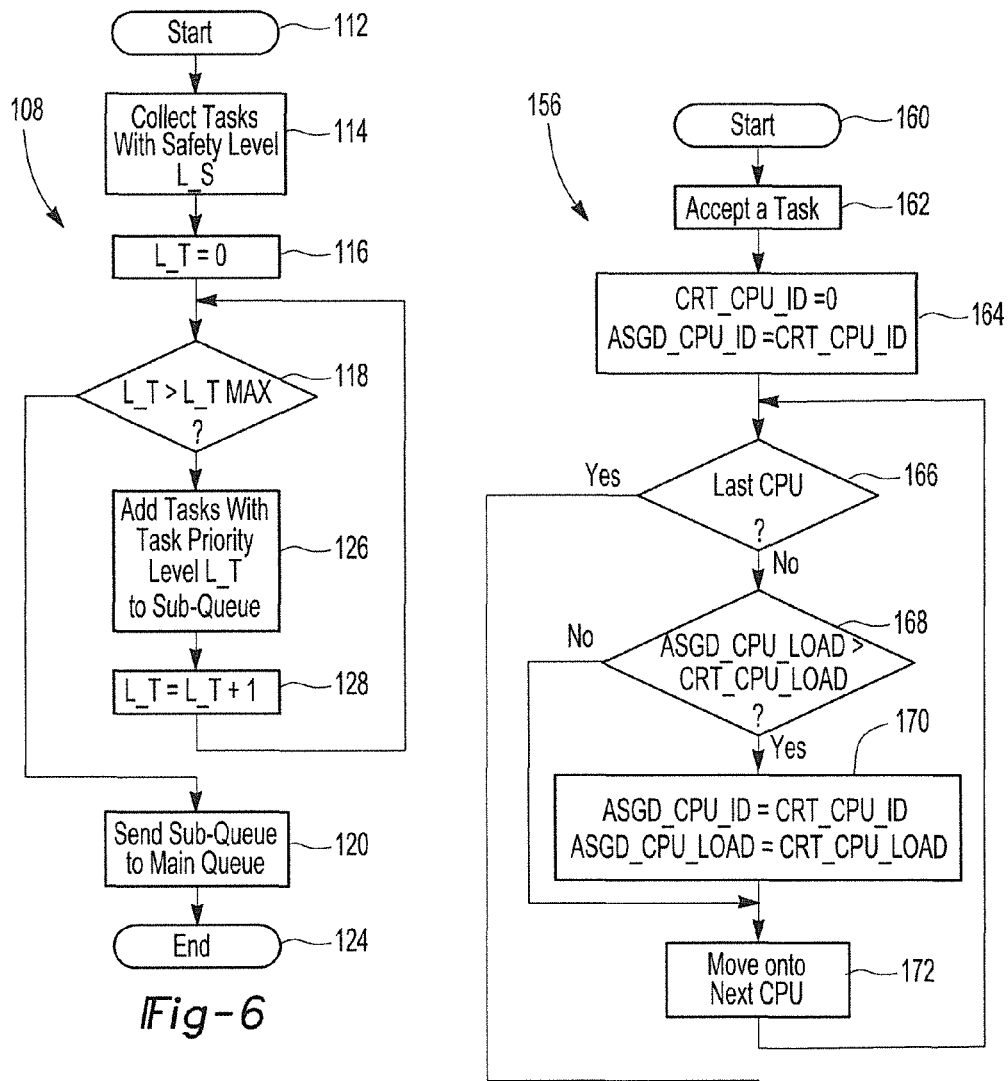
FIG. 6 is a flowchart illustrating a portion of the operation of the task arbitrator.
FIG. 7 is a diagram illustrating the workflow of the task distributor in shared mode.
FIG. 8 is a diagram illustrating the task assignment workflow of the task distributor in shared mode.

With reference then to FIG. 6, after initiation of the algorithm at step 112, step 112 proceeds to step 114 where all of the tasks with a safety level are collected. Step 114 then proceeds to step 116 where a variable L_T used to store the current task priority is initially set to 0. Step 116 then proceeds to step 118. At step 118, the variable L_T is first compared to a maximum threshold value L_T_MAX for that variable. If it is equal to the maximum threshold, step 118 branches to step 120 and sends the subqueue, each task having the same safety level, to the main queue 122 (FIG. 3). Step 120 then proceeds to step 124 and terminates the algorithm.

Conversely, if the variable L_T is less than its maximum amount L_T_MAX, step 118 instead proceeds to step 126 where the task with the task priority L_T is added to a subqueue. Furthermore, step 126 will add all of the tasks with the same safety level to the subqueue before proceeding to step 128.

At step 128, the variable L_T representing the safety level is incremented and step 128 proceeds back to step 118. The above process is repeated, this time for the next higher safety level to form a new subqueue until all of the safety levels have been processed. When they have all been processed, step 118 branches to step 120 and then to step 124 in which the entire ordered or prioritized tasks are queued in the main queue 122 (FIG. 3) from the task arbitrator 82.

It will be understood, of course, that the entire above process is repeated for each time segment ΔT. ΔT typically will equal a few milliseconds so that typically an easily manageable number of tasks are formed in the main queue 122 at any given time.

With reference again to FIG. 5, after all the tasks with the same safety level have been identified and formed into a subqueue, step 108 proceeds to step 130 where those tasks are then shifted to the main queue 122 (FIG. 3). Step 130 then proceeds to step 132 where the safety level L_S is incremented. Step 132 then proceeds back to step 106 where the above process is repeated for the next safety level until all of the safety levels have been processed as determined at step 106. At that point, the task arbitrator algorithm ends at step 110 for that time interval ΔT.

In this fashion, it can be seen that the task arbitrator queues up or prioritizes the tasks in the main queue 122 with the tasks with the highest safety level 0 at the start of the queue and the tasks with the lowest safety level 2 at the rear of the queue 122. This thus ensures that the high priority tasks will be executed before the lower priority safety tasks.

After the completion of the algorithm illustrated in FIG. 5, and with reference back to FIG. 4, step 98 proceeds to step 134 where the time is incremented by ΔT. Step 134 then proceeds back to step 94 where the above process is repeated by a task arbitrator 82.

FIGS. 11A and 11B represent the prioritization of the tasks 140 performed by the task arbitrator 82. In particular, FIG. 11A shows the task ID 1-6 in the sequential order as they are received by the task arbitrator 82. These tasks 1-6 have different safety levels which range from the highest level of 0 to the lowest level of 3. Each task ID also includes a task priority as well as an application ID. All the tasks 1-6 are received within the time window $T_N$-ΔT to $T_N$.

FIG. 11B represents the tasks after they have been prioritized by the task arbitrator 82. As clearly shown, the tasks with the highest safety level 0 are arranged first, followed by safety levels 1, 2, and 3.

Figure 9:
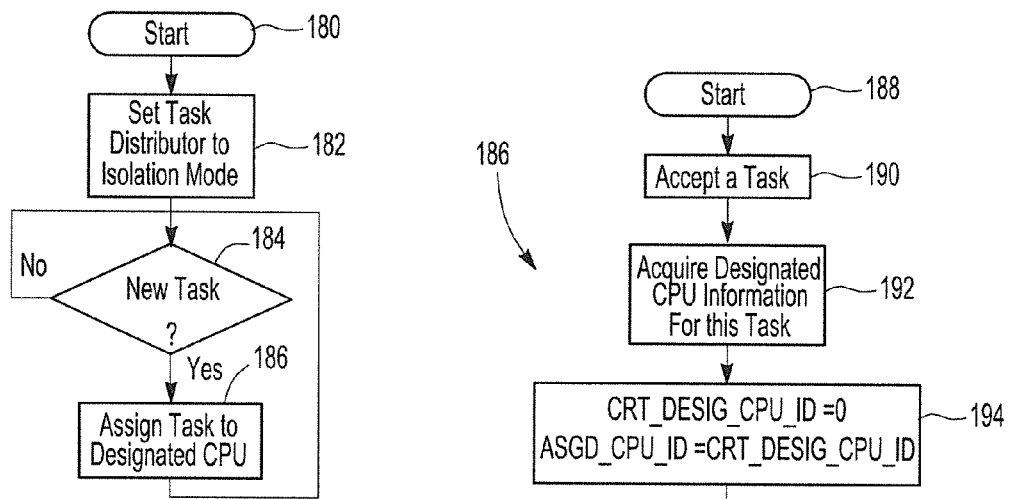
FIG. 9 is a diagram illustrating the workflow of the task distributor in isolation mode.

With reference again to FIG. 3, the main queue 122 is then coupled as an input to a task distributor 142 which determines which of the multiple processing units 44, 46, and 48 will execute the tasks 140 as they exit from the main queue 122. The task distributor 142 is operable in either a shared mode or an isolation mode, each of which will be separately described. With reference then to FIGS. 3 and 9, in the shared mode, the task distributor 142 will assign the tasks 140 as they are received from the main queue 122 to the processing unit 44-48 having the lowest CPU load. The task distributor algorithm for shared mode is illustrated in FIG. 7 in which, after initiation at step 150, step 150 proceeds to step 152. At step 152, the algorithm sets the task manager to shared mode. Step 152 then proceeds to step 154.

At step 154 a task 140 is received from the main queue 122. If a new task exists, step 154 proceeds to step 156 in which the task distributor assigns the task 140 to the CPU 44-48 with the lightest CPU load. Step 156 then proceeds back to step 154 until all of the tasks 140 have been received and processed by the task distributor. After all the tasks have been processed, at least for the time period ΔT, step 154 merely branches back to itself 154 until new tasks 140 are received from the main queue 122.

Step 156 is shown in greater detail in FIG. 8 which, after initiation of the algorithm at step 160, step 160 proceeds to step 162 where a task 140 is accepted from the queue 122. Step 162 then proceeds to step 164.

At step 164, the current CPU identification CRT_CPU_ID is set to 0. The available CPU ID ASGD_CPU_ID is then set to the current CPU ID CRT_CPU_ID. Step 164 then proceeds to step 166. At step 166, the algorithm determines whether the current CPU ID CRT_CPU_ID is the last of the processing units 44-48. If not, step 166 proceeds to step 168. At step 168, the CPU load for the available CPU is greater than the CPU load for the current CPU. If so, step 168 proceeds to step 170 where the available CPU ID ASGD_CPU_ID is set to the current CPU ID CRT_CPU_ID and the available CPU load ASGD_CPU_LOAD is assigned to the current CPU load CRT_CPU_LOAD. Step 170 then proceeds to step 172. Similarly, if the available CPU load is less than the current CPU load at 168, step 168 proceeds directly to step 172. Consequently, steps 168 and 170 together ensure that the task is assigned to the available processing unit ASGD_CPU_ID with the lowest computational load. That assignment occurs at step 174 after the last processing unit 44-48 has been processed at step 166. The algorithm then ends at step 176.

FIG. 12A illustrates the assignment of the processing units 44-48 by CPU ID 0-3 in shared mode. When the task distributor 142 operates in shared mode, the tasks are assigned to the processing unit 44-48 having the most available computational load.

The task distributor may also be operated in an isolation mode. In the isolation mode one or more processing units 44-48 are assigned to each specific safety level. The operation of the isolation mode is best shown with reference to FIG. 9 in which, after initiation of the algorithm at step 180, step 180 proceeds to step 182 where the task distributor is set to isolation mode. Step 182 then proceeds to step 184.

At step 184 the task distributor determines if there is a new task 140 from the queue 122. If not, step 184 merely branches back to itself. However, if a task 140 is available, step 184 instead branches to step 186 where the tasks 140 from the main queue 122 are assigned to a designated processing unit 44-48. The algorithm performed at step 186 is shown in greater detail in FIG. 10.

Figure 10:
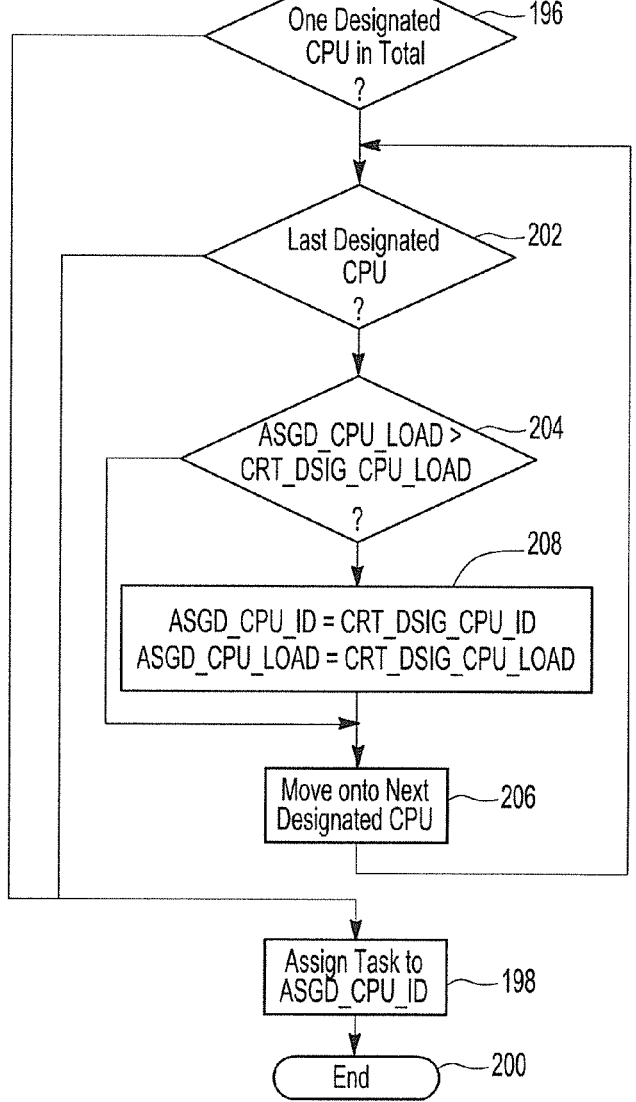
FIG. 10 is a flowchart illustrating the operation of the task distributor.

With reference then to FIG. 10, after initiation of the algorithm at step 188, step 188 proceeds to step 190 where a task 140 is accepted from the main queue 122. Step 190 then proceeds to step 192.

At step 192, the designated CPU information for the task 140 is acquired. Step 192 then proceeds to step 194 and assigns the current designated CPU ID CRT_DESIG_CPU_ID to 0 and also assigns the available CPU ID ASGD_CPU_ID to the current designated CPU ID. Step 194 then proceeds to step 196.

At step 196, the algorithm determines if one or multiple CPUs are designated to handle the particular safety load for the task. If there is only a single processing unit assigned to that particular safety level, step 196 branches to step 198 and then terminates the algorithm at step 200.

Conversely, in many situations, particularly high safety level tasks, two or more processing units 44-48 will be assigned to that particular safety level. In this case, step 196 proceeds to step 202 which determines that the current designated CPU ID CRT_DESIG_CPU_ID is the last designated processing unit 44-48. If so, step 202 branches to step 198, assigns the task to that processing unit, and then exits at step 200. Otherwise, step 202 proceeds to step 204.

At step 204 the load for the available processing unit is compared to the load for the current designated processing unit CRT_DSIG_CPU_LOAD. If greater, step 204 branches to step 206. Otherwise, step 204 proceeds to step 208 where the available processing unit ID ASGD_CPU_ID is set to the current designated processing unit CRT_DESIG_CPU_ID and, similarly, the available CPU load ASGD_CPU_LOAD is set to the current processing unit load CRT_DSIG_CPU_LOAD. Step 208 then proceeds to step 206. At step 206, the next available processor is examined until all the processors for a particular safety level have been examined to determine the available processor for the particular safety load with the current lowest computational load.

FIG. 12B illustrates the assignment of the tasks by the task distributor 142 in isolation mode. In isolation mode the processing unit 44-48 with the CPU ID 0 is assigned solely to process tasks having a safety level of 0. Conversely, the processing unit having a CPU ID of 1 processes tasks with assignment levels 1-2 while the processing unit with CPU ID 2 processes tasks with safety levels 3-4 and so on.

From the foregoing, it can be seen that the present invention provides an electronic control system for an automotive vehicle in which the computation capacity required to not only analyze the tasks but to provide the proper output signals to the various actuators in the various vehicle systems is under the central control of the general processing unit. This, in turn, enables the individual systems to be readily updated by merely updating the software in the central processing unit. Furthermore, reduction in the number and/or power of processors used by the individual systems in the vehicle due to the central processing unit reduces the overall cost of the control system for the vehicle.

Having described our invention, many modifications thereto will become apparent to those skilled in the art to which it pertains without deviation from the spirit of the invention as defined by the scope of the appended claims.

We claim:

1. For use in conjunction with an automotive vehicle, a control system for the vehicle comprising:
    a plurality of subsystems, each subsystem having a sensor which detects a vehicle condition and/or an actuator which, when actuated, performs a vehicle function, wherein a safety level is assigned to each subsystem, wherein there are at least three safety levels;
    a general purpose processor programmed to execute a plurality of software applications, each software application associated with operation of an associated subsystem of the plurality of subsystems, the general purpose processor comprising a plurality of processing units;
    a bus electrically connected to the general purpose processor and the subsystems which provides communication between the processing units and the subsystems,
    wherein each subsystem includes a communication interface to receive commands from the general purpose processor and/or to send respective subsystem tasks to the general purpose processor via the bus; and
    a task arbitrator which continually receives subsystem tasks and groups the received subsystem tasks according to a preset time period within which each subsystem task is received, wherein for each preset time period of a plurality of preset time periods, the task arbitrator prioritizes an order of execution of multiple subsystem tasks within the group of subsystem tasks received by the general purpose processor during the preset time period, wherein for each group, the task arbitrator prioritizes the order of execution of the multiple subsystem tasks within that group based on the safety level assigned to each subsystem,
    wherein the general purpose processor initiates execution of the software application associated with the subsystem of the subsystem task received from the task arbitrator and thereafter transmits a control signal to one or more subsystems via the bus as a result of the execution of the associated software application,
    wherein the general purpose processor performs data computations on data received from or sent to the subsystems.

2. The control system as defined in claim 1, wherein the general purpose processor comprises a plurality of general purpose processors, each having a plurality of processing units.

3. The control system as defined in claim 1, wherein the plurality of processing units comprise at least one multiple core processor.

4. The control system as defined in claim 1, wherein the task arbitrator arranges each group of subsystem tasks received over the respective time period into a respective queue for the respective time period, wherein the subsystem tasks are arranged in the respective queue in an order based on the safety level associated with each of the subsystem tasks received in the time period.

5. The control system as defined in claim 4, wherein the general purpose processor comprises a task distributor which receives the subsystem tasks from the task arbitrator and forwards each of the subsystem tasks from the respective queue to a selected processing unit.

6. The control system as defined in claim 5, wherein the task distributor assigns respective ones of the subsystem tasks from the respective queue to respective ones of the processing units as a function of a respective computational load of the respective processing units.

7. The control system as defined in claim 5, wherein:
individual ones of the processing units are assigned to processing subsystem tasks corresponding to a particular one of the safety levels, and
the task distributor assigns respective ones of the subsystem tasks to respective individual processing units as a function of the safety level of the subsystem tasks.

8. The control system as defined in claim 1, further comprising memory accessible by the general purpose processor, wherein at least some of the software applications are maintained in respective different memory partitions based on the safety level associated the subsystem associated with each respective software application.

9. A method for controlling an automotive vehicle, the vehicle having a plurality of subsystems, each subsystem with a sensor to detect an engine condition and/or an actuator to perform a vehicle function comprising the steps of:
providing a general purpose processor programmed to execute a plurality of software applications, each software application associated with the operation of an associated subsystem of the plurality of subsystems, wherein a safety level is assigned to each subsystem, wherein there are at least three safety levels;
providing a bus electrically connected to the general purpose processor and the vehicle subsystems which provides communication between a plurality of processing units of the general purpose processor and the subsystems,
wherein each subsystem includes a communication interface to receive commands from the general purpose processor and/or to send respective subsystem tasks to the general purpose processor via the bus; and
for each preset time period of a plurality of present time periods, prioritizing an order of execution of multiple subsystem tasks received by the general purpose processor during the preset time period with a task arbitrator,
wherein the task arbitrator continually receives subsystem tasks and groups the received subsystem tasks according to the preset time period within which each subsystem task is received, wherein for each group, the task arbitrator prioritizes the order of execution of the multiple subsystem tasks within that group based on the safety level assigned to each subsystem;
initiating execution the software application associated with the subsystem of the subsystem task received from the task arbitrator; and
thereafter transmitting a control signal to one or more subsystems via the bus as a result of the execution of the associated software application,
wherein the general purpose processor performs data computations on data received from or sent to the subsystems.

10. The method as defined in claim 9, wherein the general purpose processor comprises a plurality of general purpose processors, each having a plurality of processing units.

11. The method as defined in claim 9, wherein the plurality of processing units comprise at least one multiple core processor.

12. The method as defined in claim 9, further comprising:
arranging, by the task arbitrator, each group of subsystem tasks received over the respective time period into a respective queue for the respective time period, wherein the subsystem tasks are arranged in the respective queue in an order based on the safety level associated with each of the subsystem tasks received in the time period.

13. The method as defined in claim 12 wherein the general purpose processor comprises a task distributor which receives the subsystem tasks from the task arbitrator and forwards each the subsystem tasks from the respective queue to a selected processing unit.

14. The method as defined in claim 13, further comprising assigning execution of respective ones of the subsystem tasks to respective ones of the processing units as a function of a respective computational load of the respective processing units.

15. The method as defined in claim 13, further comprising assigning a safety level to individual ones of the processing units wherein the task distributor assigns respective ones of the subsystem task to the individual processing units based on the safety level of the subsystem tasks.

16. The method as defined in claim 9, wherein a memory is accessible by the general purpose processor, the method further comprising maintaining at least some of the software applications in respective different memory partitions based on the safety level associated the subsystem associated with each respective software application.

17. A control system for the vehicle, the control system comprising:
a plurality of subsystems, each subsystem having a sensor which detects a vehicle condition and/or an actuator which, when actuated, performs a vehicle function, wherein a safety level is assigned to each subsystem;
a general purpose processor programmed to execute a plurality of software applications, each software application associated with operation of an associated subsystem, the general purpose processor comprising a plurality of processing units for performing data computations on data received from or sent to the subsystems;
a bus electrically connected to the general purpose processor and the subsystems which provides communication between the processing units and the subsystems;
a task arbitrator which continually receives subsystem tasks from the subsystems and groups the received subsystem tasks according to a preset time period within which each subsystem task is received, wherein for each preset time period of a plurality of preset time periods, the task arbitrator prioritizes an order of execution of multiple subsystem tasks within the group of subsystem tasks received by the general purpose processor during the preset time period, wherein for each group, the task arbitrator prioritizes the order of execution of the multiple subsystem tasks within that group based on the safety level assigned to each subsystem; and
memory accessible by the general purpose processor, wherein at least some of the software applications are maintained in respective different memory partitions based on the safety level associated the subsystem associated with the respective software applications,
wherein the general purpose processor initiates execution of the software application associated with the subsystem of the subsystem task received from the task arbitrator and thereafter transmits a control signal to one or more of the subsystems via the bus as a result of the execution of the associated software application.

18. The control system as defined in claim 17 wherein the general purpose processor comprises a plurality of general purpose processors, each having a plurality of processing units.

19. The control system as defined in claim 17 wherein the plurality of processing units comprise at least one multiple core processor.

20. The control system as defined in claim 17 wherein:
the task arbitrator arranges each group of subsystem tasks received over the respective time period into a respective queue for the respective time period, and
the subsystem tasks are arranged in the respective queue in an order based on the safety level associated with each of the subsystem tasks received in the time period.

* * * * *